March 4, 1924.  1,485,886
C. B. RUSSELL
CUTTING STICK FOR PAPER CUTTING MACHINES AND THE LIKE
Filed Sept. 23, 1921
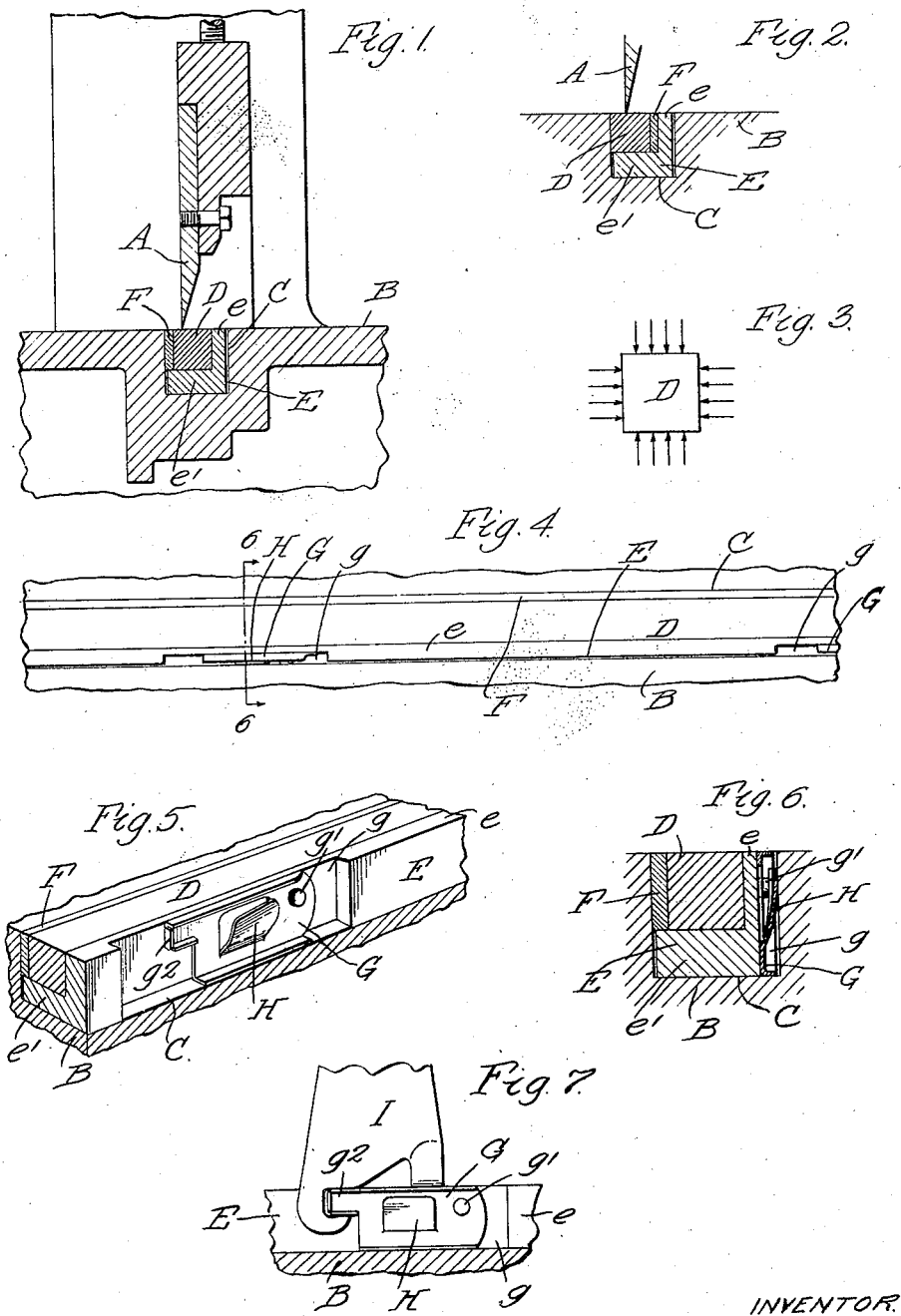

Patented Mar. 4, 1924.

1,485,886

UNITED STATES PATENT OFFICE.

CHARLES B. RUSSELL, OF BUFFALO, NEW YORK.

CUTTING STICK FOR PAPER-CUTTING MACHINES AND THE LIKE.

Application filed September 28, 1921. Serial No. 503,834.

*To all whom it may concern:*

Be it known that I, CHARLES B. RUSSELL, citizen of the United States, residing at Buffalo, in the county of Erie and State of New York, have invented a new and useful Improvement in Cutting Sticks for Paper-Cutting Machines and the like, of which the following is a specification.

This invention relates to improvements in cutting sticks for paper cutting machines. In cutting sticks of this kind as heretofore used, a wooden strip is usually employed which is held in a groove or slot in the machine and with which the edge of the knife or cutting tool engages after the same has passed through the material which is being cut. These wooden cutting strips soon wear out and it has therefore been found desirable to substitute a metal strip in place of the wooden ones heretofore used, aluminum or other relatively soft metal being preferably employed to prevent injury to the knife edge. The action of the cutting tool on a metal cutting strip, however, tends to expand or pack the metal in the groove in which the strip is held so that the clamping means or devices for the strip become jammed or bound in the slot, making it difficult or impossible to remove the cutting strip without injury thereto or to the clamping parts of the cutting stick.

One of the objects of this invention is to provide a cutting stick of this kind which is provided with locking means for holding the cutting strip in its operative position, which are particularly desirable for use in connection with metal cutting strips. Another object is to provide holding means for the cutting strip which make it possible to use a greater number of portions of the cutting strip than was heretofore possible, and thereby greatly lengthen the life of the strip. Further objects of the invention are to improve cutting sticks of this kind in other respects hereinafter specified.

In the accompanying drawings:

Fig. 1 is a fragmentary sectional elevation of a paper cutting machine having a cutting stick embodying the invention.

Fig. 2 is a similar fragmentary end elevation thereof showing the parts of the cutting stick arranged in different positions so as to expose another part of the cutting strip to the cutting edge.

Fig. 3 is an end view of a cutting strip, the arrows indicating the several portions of the cutting strip which may be exposed to the cutting edge.

Fig. 4 is a top plan view of the table of the cutting machine.

Fig. 5 is a fragmentary sectional perspective view thereof.

Fig. 6 is a transverse section thereof on line 6—6, Fig. 4.

Fig. 7 is a fragmentary side view of a cutting stick in the groove of the table and showing a tool or key for releasing the cutting stick.

A represents the knife and B the bed plate of a cutting machine of ordinary type, in which the knife is movable toward and from the bed plate. The bed plate is provided with a slot or groove C which extends parallel with and below the knife and in which the cutting stick is confined. These parts may be of any usual or suitable construction.

The cutting stick comprises a strip D which is preferably made of aluminum or other suitable material and with which the knife is adapted to engage after passing through the material which is being cut. This cutting strip is supported by a clamping bar or member E which is of angular shape in cross section and which has a substantially upright leg or flange $e$ engaging a side of the cutting strip and a lower leg or flange $e'$ on which the cutting strip rests. The clamping member preferably fits loosely within the groove C and is so proportioned that the upper face of the cutting strip D will lie in operative relation to the knife, for example, parallel with the upper face of the table B, as in the construction shown. A spacing bar F is preferably also used in connection with the cutting stick, the spacing bar being of the same height as the cutting stick D which latter is preferably square in cross section. The spacing bar is also supported by the angle shaped clamping member and may be arranged at either side of the cutting strip, as shown in Figs. 1 and 2. In order to hold the parts of the cutting stick in the slot in the bed plate of the machine in such a manner as to secure the cutting strip D in the groove, the clamping member E is preferably provided at intervals with recesses $g$ within which suitable spring wedges are arranged, the recesses, in the construction shown, being arranged on that side of the upright leg $e$ which is adjacent to the wall of the groove. These wedges are forced into the slot C in such a manner as to clamp the cutting strip in the groove.

In order to prevent the cutting stick from wedging in the groove due to the expansion of the metal cutting strip when subjected to the continued action thereof on the knife, spring wedges are preferably used, namely wedges of the kind in which the wedge faces are yieldingly held in their operative positions. In the construction shown for this purpose, the wedges G are made of a single piece of sheet metal such, for example, as a spring steel, having a part H bent at an angle to the body portion of the wedge. These two parts of the metal plate, disposed at an angle to each other, form the spring wedge, the parts of which may be moved toward each other against the spring action, and consequently, when a wedge of this form is used, the wedge is moved into the recesses $g$ in such a manner as to press the two wedge faces toward each other. This places the parts of the cutting strip under compression and clamps the cutting strip in the desired position. If, due to the continued action of the knife edge upon the cutting strip D, the cutting strip becomes expanded laterally beyond the normal size, this expansion of the cutting strip will only produce a further compression of the spring wedge and will not bind the wedge G in the locking position. Consequently, the wedges can always be easily swung upwardly into their inoperative positions to release the parts of the cutting strip. The use of spring wedges also has the advantage that a slight inaccuracy in the size of the parts of the cutting stick or of the groove in the table will not interfere with the secure holding of the cutting strip in the proper position. These wedges are preferably so formed that when in their holding positions, their upper edges do not extend above the upper face of the bed plate. The wedges may, if desired, be suitably connected with the clamping member E, the wedges shown in the construction illustrated being pivoted thereon. For this purpose, the wedge plates or body portions of the wedges are provided with holes through which studs or projections $g'$ secured on or formed integral with the clamping member E, extend. The edge portions of the wedges are preferably bent at an angle to the body portions thereof so as to stiffen the body portions, and each wedge is provided with the usual projection $g^2$ which may be engaged by means of a suitable tool I for swinging the wedge about its pivot. When the wedge is swung downwardly about the pivot $g'$ into its operative position, the spring part H engages the wall of the groove and is compressed into the position shown in Fig. 6. The spring wedges are made strong enough so as to securely hold the cutting strip D in its operative position.

The repeated engagement of the knife edge with the same portion of the cutting strip tends to wear this portion of the cutting strip so that eventually the worn portion will interfere with the proper cutting of the material. In order to make it possible to expose a number of different portions of each face of the cutting strip to the knife, the spacing bar F is employed, and the parts of the cutting stick are so proportioned that when the spacing bar F is at the outer side of the cutting strip, as shown in Fig. 1, the knife edge will engage the strip adjacent to the edge thereof. After this portion of the cutting strip has been worn out, the cutting strip may be turned around end for end so that the side adjacent to the arm $e$ of the clamping member will be moved into engagement with the spacing member F, as shown in Fig. 1. This will permit the knife edge to engage with a different portion of the same face of the cutting strip. By moving the spacing bar F to the opposite side of the cutting strip, as shown in Fig. 2, still another portion of the surface of the cutting strip is exposed to the action of the knife, and by again reversing the cutting strip end for end, as heretofore described, the fourth portion of the same face of the cutting strip will be exposed to the knife. Since the cutting strip has four sides or faces and is square in cross section, it will be evident, as shown in Fig. 3, that sixteen different portions of the cutting strip may be exposed to the action of the knife, four portions on each face of the strip. By means of this arrangement, the life of the cutting strip is materially increased. The cutting stick described can be quickly operated for releasing or clamping the cutting strip, and the spring wedges serve not only to prevent the binding of the cutting stick in the slot in the table, due to the expansion of the cutting strip, but also make it possible to use cutting strips which have been somewhat deformed owing to the fact that several sides thereof have been exposed to the action of the cutting edge, since the spring wedges permit a certain amount of leeway in the dimensions of the cutting strip and serve to hold the strip rigidly in operative position regardless of changes in the dimensions thereof, such as are incident to the use of cutting sticks.

I claim as my invention:

1. A cutting stick adapted to be inserted in a slot in a cutting machine and including a clamping bar, a strip engaged by said bar and adapted to be clamped in said slot, and yielding means adapted to be moved into said slot and to bear against a side of said slot to yieldingly move said clamping bar into a position to grip said strip.

2. A cutting stick adapted to be inserted in a slot in a cutting machine and including a clamping bar, a strip engaged by said bar and adapted to be clamped in said slot, and a spring wedge adapted to be forced into said slot to yieldingly hold said clamping bar in a position to grip said strip.

3. A cutting stick adapted to be inserted in a slot in a cutting machine and including a cutting strip, and means for clamping said strip in said slot including a plate of resilient material having two portions bent at an angle to each other to form a spring wedge.

4. A cutting stick adapted to be inserted in a slot in a cutting machine and including a clamping bar, a strip engaged by said bar and adapted to be clamped in said slot, and a spring wedge adapted to be moved into said slot to press said clamping bar into a position to grip said cutting stick, said wedge consisting of a plate of resilient material having a part bent at an angle to said plate.

5. A cutting stick adapted to be inserted in a slot in a cutting machine and including a clamping bar, a strip engaged by said bar and adapted to be clamped in said slot, and a spring wedge pivotally mounted on said clamping bar and adapted to be swung into and out of said slot, said wedge comprising a spring plate having a part bent at an angle to the body portion thereof.

6. A cutting stick adapted to be inserted in a slot in a cutting machine and including a clamping bar, a strip engaged by said bar and adapted to be clamped in said slot, a spring wedge consisting of a resilient metal plate, the body portion of which is provided with laterally bent edge portions and which has an arm bent at an angle to said body portion, and a pivotal connection between said wedge and said clamping bar, whereby said wedge may be swung into and out of said slot.

7. A cutting stick adapted to be inserted in a slot in a cutting machine and including a clamping bar of substantially angle shaped cross section having one flange arranged substantially horizontally at the bottom of said slot, a cutting strip resting on said flange, a spacing bar also resting on said flange, and means for clamping said parts in said slot, whereby said spacing bar may be arranged at either side of said cutting strip.

8. A cutting stick adapted to be inserted in a slot in a cutting machine and including a clamping bar of substantially angle shaped cross section having one flange arranged substantially horizontally at the bottom of said slot, a cutting strip resting on said flange, a spacing bar also resting on said flange whereby said spacing bar may be arranged at either side of said cutting strip, the combined width of said strip and said spacing bar being greater than the width of the upper face of said flange, and means engaging said clamping bar for pressing said strip and spacing bar against an edge of said slot.

9. A cutting stick adapted to be inserted in a slot in a cutting machine and including a clamping bar of substantially angle shaped cross section having one flange arranged substantially horizontally at the bottom of said slot, a cutting strip resting on said flange, a spacing bar also resting on said flange, the combined width of said strip and said spacing bar being greater than the width of the upper face of said flange, and spring pressed means for yieldingly holding said clamping bar in a position to secure said strip in said slot.

10. A cutting stick adapted to be inserted in a slot in a cutting machine and including a clamping bar, a strip engaged by said bar and adapted to be clamped in said slot, and a spacing bar adapted to be arranged at either side of said strip to expose different portions of the face of said strip to the action of the cutting member of said machine.

CHARLES B. RUSSELL.